Inventor
Pinkney Owen,
By Victor J. Evans.
Attorney

No. 824,576. PATENTED JUNE 26, 1906.
P. OWEN.
PLANTER.
APPLICATION FILED APR. 14, 1906.
2 SHEETS—SHEET 2.
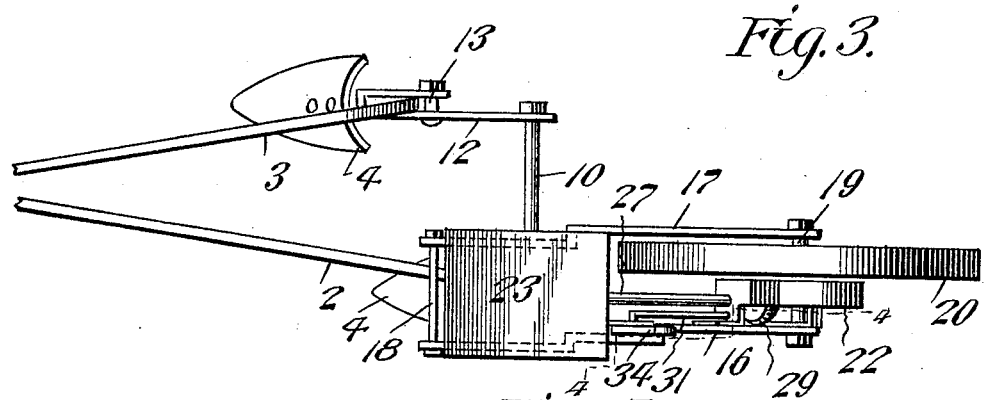
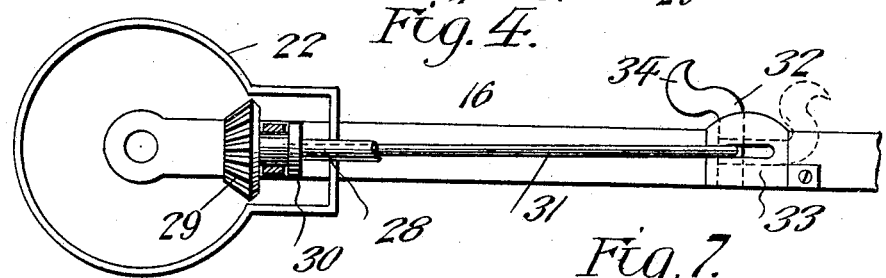
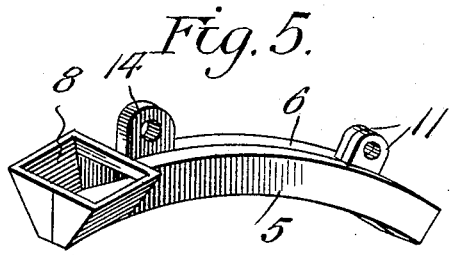
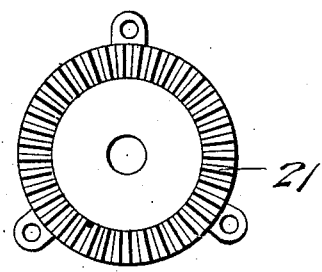
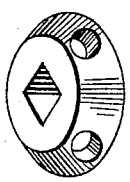
Inventor
Pinkney Owen,
By Victor J. Evans.
Attorney
Witnesses
Geo Ackman
C. C. Hines

UNITED STATES PATENT OFFICE.

PINKNEY OWEN, OF BOONSHILL, TENNESSEE.

PLANTER.

No. 824,576.	Specification of Letters Patent.	Patented June 26, 1906.

Application filed April 14, 1906. Serial No. 311,729.

*To all whom it may concern:*

Be it known that I, PINKNEY OWEN, a citizen of the United States of America, residing at Boonshill, in the county of Lincoln and State of Tennessee, have invented new and useful Improvements in Planters, of which the following is a specification.

This invention relates to a seed-planter attachment for plows or cultivators, the object of the invention being to provide a simple and effective device of this character which can be readily attached to a double-shovel plow, cultivator, or like agricultural implement, whereby the operation of planting seed may be carried out during the work of plowing or cultivating.

The device is primarily designed for planting millet, peas, and sorghum, but may be employed for planting any similar kind or shape of seed, and provides a readily-controlled apparatus by which peas may be planted between rows of corn while the latter is being cultivated, millet-seed sowed during the operation of breaking ground, and sorghum and other seed planted at any time while the work of plowing or cultivating is being carried on.

With the above and other objects in view the invention consists of the novel construction and combination of parts hereinafter fully described and claimed, reference being had to the accompanying drawings, in which—

Figure 1:
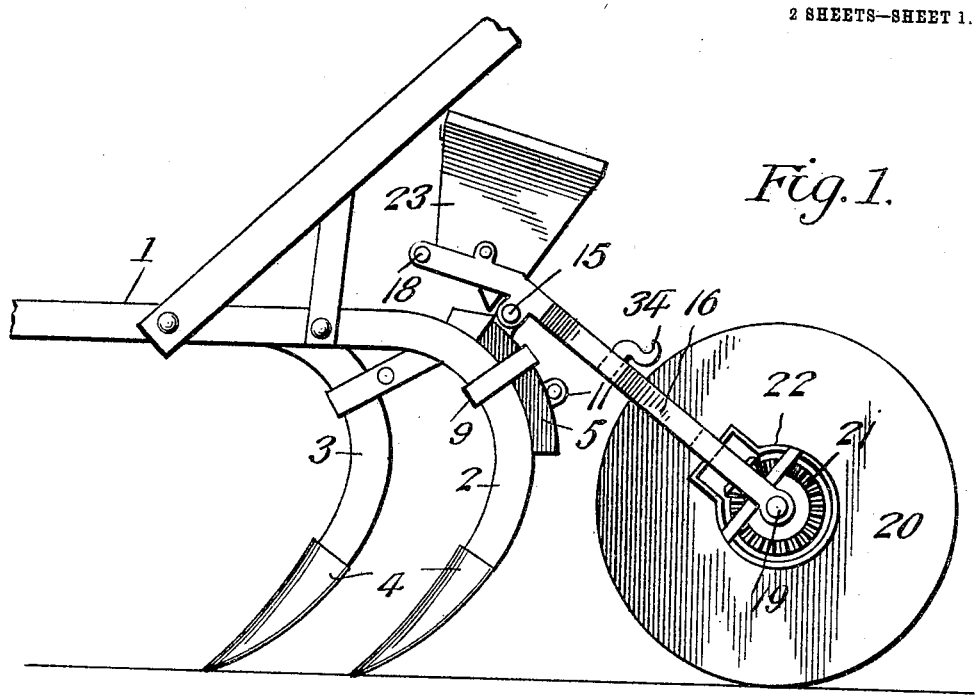
Figure 2:
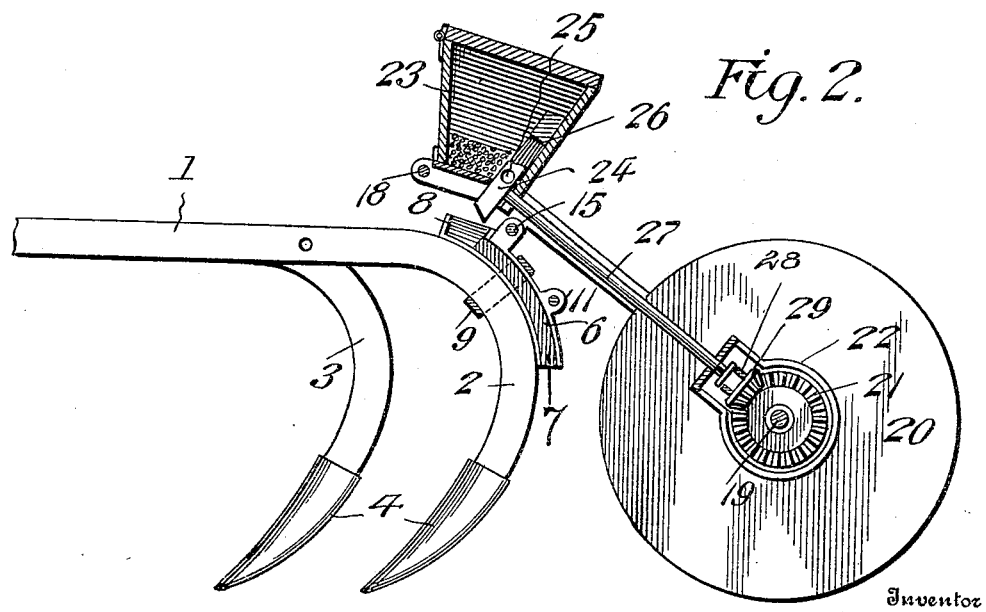

Figure 1 is a side view of a double-shovel plow equipped with my invention. Fig. 2 is a similar view showing parts of the planter in longitudinal section. Fig. 3 is a top plan view of the plow and planter. Fig. 4 is a section on an enlarged scale, taken substantially on the line 4 4 of Fig. 3. Fig. 5 is a detail view of the seed-chute. Fig. 6 is a cross-section of the same. Fig. 7 is a face view of the bevel drive-gear. Fig. 8 is a detail view of the feed-wheel.

Referring to the drawings, 1 designates the beam of a plow provided at its rear with standards 2 and 3, disposed one in rear of the plane of the other and carrying the shovels 4.

Mounted upon the rear curved surface of the standard 2 is a combined attaching device and seed-chute curved to conform therewith and composed of channeled longitudinal sections 5 and 6, coöperating to form a chute-passage 7 and a forward seed pocket or cup 8. The sections 5 and 6 are connected to each other and secured to the standard by a clip 9 and are further connected by a bolt 10, extending through companion ears 11 thereon. The bolt 10 projects laterally to a point in rear of the standard 3 and is connected with one of the arms of a yoke 12, said yoke being arranged to embrace said standard 3 and held in position thereon by a coupling-bolt 13. By this means the combined attaching device and seed-chute is reinforced and securely fastened in position.

The section 6 carries an apertured lug 14 for the reception of a pin or bolt 15, forming a pivotal support for the forward end of the planter-frame, which latter comprises a pair of spaced beams 16 and 17, connected at their front and rear ends by bolts 18 and 19. The frame is supported at its lower end by a covering-wheel 20, revolubly mounted on the bolt 19 and having fixed thereto a beveled drive-gear 21, inclosed by a protective frame or casing 22, fastened to the beam 16.

Mounted upon the forward end of the planter-frame is a hopper 23, provided in its bottom with a slot for the reception of a feed disk or wheel 24, having a beveled face and formed with one or more seed-pockets 25, said wheel being arranged to discharge into the cup 8, from which the seed passes through the chute 7 to the ground. A brush 26 or equivalent device is arranged within the hopper to remove any excess amount of seed from the pockets. The feed-disk is fixed to the forward end of a shaft 27, journaled at its forward end in the rear wall of the hopper and its lower rear end in a sleeve 28, suitably supported upon the casing 22 and beam 16, and upon the rear end of the shaft is mounted a pinion 29, said pinion being secured to the sleeve, which is mounted for rotation and sliding movement on the shaft and provided with a collar 30 to limit its downward movement. As the implement moves forward motion is transmitted through the drive-gear, pinion, and shaft to rotate the feed-wheel 24, thereby successively bringing the pockets thereof into position to take up seed from the hopper and discharge the same into the cup 8. A rod 31 is attached at its lower end to the sleeve and extends forwardly between the beams 16 and 17 and is connected at its forward end to an operating device 32, slidably mounted in a slotted bracket-plate 33, fastened to the beam 16 and formed with a suitable handle 34, whereby it may be manipulated. Through the medium of this operating device the rod 31 may be moved forward or backward to throw the pinion into and out of engagement with the drive-gear to start and stop the operation of the planter at will. It will thus be observed that the planter is adapted for attachment to an ordinary form of double-shovel plow and that the pivotal connection 15 permits the working parts of the attachment to have sufficient vertical play when the wheel 20 rides over lumps and other irregularities of surface to prevent injury to the feed-wheel or any of the other parts of the device, and, further, that the apparatus may be applied to and removed from the plow at will.

The appliance may be employed for planting different kinds of seed during the operation of breaking ground or cultivating plants, as when the plow is used for plowing corn, the device in the latter connection providing a convenient means whereby peas may be planted between the rows of corn and the seeder thrown out of operation in working between rows.

As heretofore stated, the apparatus may be employed either during plowing or cultivating operations for planting millet, peas, and sorghum; but it may also be used in connection with any type of agricultural implement for planting other kinds of seed.

Having thus described the invention, what is claimed as new is—

1. A device of the character described comprising a frame, a ground-wheel for supporting the rear of the frame, means for pivotally supporting the forward end of the frame upon an implement, said means being provided with a seed-chute, a hopper upon the frame, a seed-discharge device for discharging seed therefrom into said chute, and drive mechanism operated by the wheel for actuating said discharge device.

2. A device of the character described comprising a frame, a supporting-wheel carried thereby, an attachment for pivotally mounting said frame upon an implement, said attachment having a seed-receiving cup and a chute communicating therewith, a seed-discharge device upon the frame, a hopper carried by the frame and having an outlet-passage controlled by said discharge device, and drive mechanism operated by the wheel for actuating said discharge device.

3. A device of the character described comprising an attaching member having a seed-chute, a frame pivotally supported at its forward end upon said attaching member, a ground-wheel mounted upon the rear end of the frame, a hopper upon the forward end of the frame, a rotary seed-discharge device controlling the feed of seed from the hopper to the chute drive-gearing actuated by the wheel for operating said discharge device, and means for throwing said drive-gearing into and out of operation.

4. A device of the character described comprising an attaching member having a seed-chute, a frame pivotally supported at its forward end upon said attaching member, a ground-wheel mounted upon the rear end of the frame and carrying a drive-gear, a hopper upon the forward end of the frame, a rotary seed-discharge device controlling the feed of seed from the hopper to the chute, a shaft for operating said seed-discharge device, a pinion slidably mounted on the shaft to be thrown into and out of engagement with the drive-wheel, and means supported by the frame for throwing said pinion into and out of gear.

In testimony whereof I affix my signature in presence of two witnesses.

PINKNEY OWEN.

Witnesses:
R. C. ERWIN,
A. B. WILSON.